Nov. 27, 1923.
C. S. STEVENSON
1,475,657
DIRECTION INDICATOR FOR AUTOMOBILES
Filed March 11, 1920
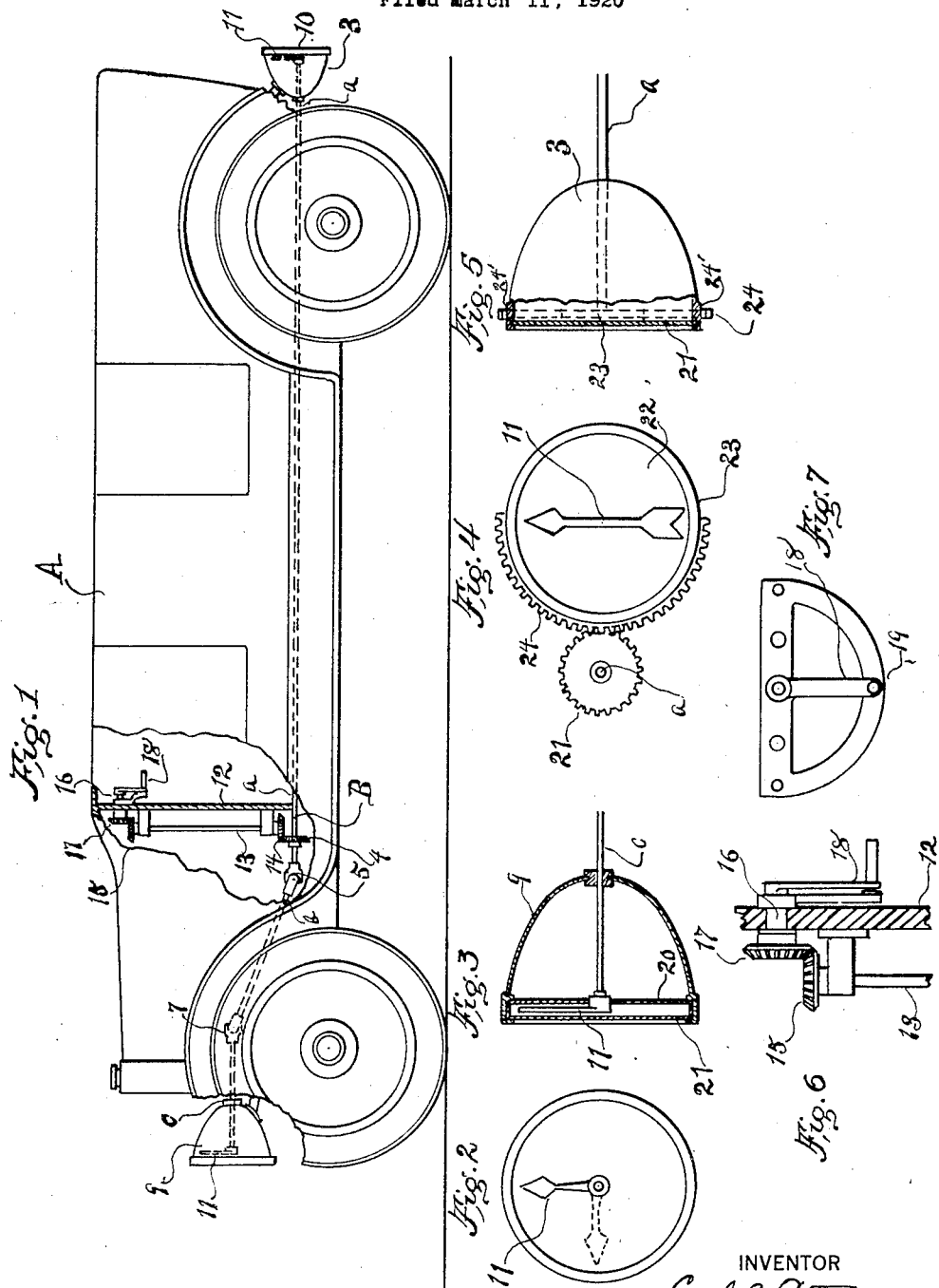
INVENTOR
Carl S. Stevenson
BY
F. N. Gillett
ATTORNEY Patented Nov. 27, 1923.

1,475,657

UNITED STATES PATENT OFFICE.

CARL S. STEVENSON, OF BINGHAMTON, NEW YORK.

DIRECTION INDICATOR FOR AUTOMOBILES.

Application filed March 11, 1920. Serial No. 365,059.

*To all whom it may concern:*

Be it known that I, CARL S. STEVENSON, a citizen of the United States, residing at Binghamton, in the county of Broome and State of New York, have invented certain new and useful Improvements in Direction Indicators for Automobiles, of which the following is a specification.

My invention relates to improvements in direction indicators for automobiles and its purpose is to provide a simple practical, easily constructed and mounted device, and one adapted to be mounted on any automobile body without material change to the same or disfigurement thereof, and is for the purpose of indicating by signal, the direction in which the car is to turn when operated on the highway or other place. With these objects in view my invention consists in certain novel features of construction and arrangement of parts as will be hereinafter fully described and pointed out in the claims, reference being had to the accompanying drawings, in which Fig. 1, is a perspective view of my device, as mounted on an automobile body.

Fig. 2, is a perspective view of a part of my device.

Fig. 3, is a side view in cross section of my device.

Fig. 4, is a perspective view of a detailed part of my device.

Fig. 5 is a side view partly in cross section, of a detailed part of my device.

Fig. 6 is a side view of a part of my device, partly in cross section.

Fig. 7 is a perspective view of a part of my device.

The same reference characters denote like parts in each of the several figures of the drawings.

In carrying out my invention, I have the automobile body A. Longitudinally mounted therein, in any convenient manner, and on the left side thereof, I have the sectional turn shaft B formed of the jointed extension sections $a$, $b$ and $c$ extending from the left head light body 9 and through the left side of body A to the rear light of automobile 3, the front end of said shaft B extending into the left head light body 9; mounted on the front end of section $a$ of said shaft I have the gear 4; on the outer front end of section $a$ of shaft B, I have the universal joint 5 and connected with section $b$ of shaft B; and mounted on the front end of section $b$, I have the universal joint 7, connected with section $c$ of shaft B, which section $c$ extends into the head light body 9; on the rear end of section $a$ of shaft B, I have mounted the arrow pointer or indicator 11. And mounted on the front end of section $c$ of shaft B and within light body 9, I have the arrow pointer or indicator pointer 11. Mounted in any convenient manner on the left and front portion of the dash board or front board 12 of car body A and in front of the operator's seat, I have the vertical shaft 13, on the lower end of which is mounted the bevel gear 14, and on its upper end the bevel gear 15, the gear 14 meshing into gear 4 on shaft section $a$. Mounted in any convenient manner in dash 12, I have the handle shaft 16, and on its outer end the beveled gear 17, meshing into gear 15, and on the inner end of said shaft the turn handle 18. Mounted vertically on the inner face of dash 12 and opposite turn handle 18, I have the semi circular plate or guide 19, its outer face having frictional contact with the handle 18 opposite it. I elect to construct the headlight and rear light bodies 9 and 3 as follows; having mounted therein in any convenient manner in the face thereof, the parallel lenses 20 and 21 as shown in Fig. 3, and between which lenses the pointer 11 turns or moves, mounted on the outer ends of shaft sections $c$ and $a$ respectively; in another form of gearing for the movement of the indicator or pointer, I have mounted on the end of section $a$ of shaft B in any convenient manner the gear 21, and within the lantern body the lens 22 mounted within a circular frame or rim 23, slidably mounted in any convenient manner in said lantern body 3, and on the outer face of said rim the semicircular gear 24, which projects out of and has free play in, the side of lantern 3 by means of the vertical slot 24' in said side, and which gear 24 meshes into gear 21; and on the face of the lens 22, I display the form of the indicator 11, by painting the outline indicator figure 11 on the face of lens 22, or by means of any other convenient form of outline display. In the operation of my device, when in normal position, the indicator 11 and the handle 18 are vertical; when I wish to turn to the right, I indicate the direction of turning to the right, by moving the handle 18, if in a downward vertical position, to the left, which turns shaft 13, which turns shaft sections $a$, $b$ and $c$ and the indicator or pointer 11, to the right; when I wish to turn to the left, I indicate that direction by moving the handle 18 to the right, which turns shaft sections, $a$, $b$, and $c$ and with it indicator 11 to the left. I elect to have on the arc face of plate 19 a series of shallow notches in which the handle 18 may rest and be easily moved from one notch to another. By means of the frictional contact or pressure of handle 18 against plate 19 or in the notches in the face of the same, the handle 18 on being turned and with it indicator 11, to any given position, it remains in a fixed position until the handle 18 is moved back to its vertical normal position shown in Fig. 1. Thus the signal pointer is moved in a corresponding degree with the movement of the handle. The transmitted movement being accurately controlled by the gearing.

Thus having described my invention what I claim as new and for which I desire Letters Patent is as follows:

1. In a direction indicator for vehicles, the combination with a vehicle having the customary headlights and a rear light disposed in different horizontal planes, of a shaft extending longitudinally of the vehicle at one side thereof, said shaft extending to the rear light, flexible shafting extending from the longitudinal shaft to the headlight, direction indicating means on the front and rear lights and means for operating the shafts and the signal means.

2. In a direction indicator for vehicles the combination of a vehicle having the customary headlights and a rear light, of a rotatable lens mounted on the head and rear lights said lens being provided with a gear, a turn shaft extending longitudinally of the car and provided with universal couplings intermediate its ends, gears on the ends of the shaft for engagement with the gears on the lenses, direction indicating means carried by the lenses and means for operating the shaft and the lenses.

In testimony whereof I have affixed my signature.

CARL S. STEVENSON.